G. WODTLI.
GOVERNOR FOR SPRING MOTORS.
APPLICATION FILED OCT. 2, 1907.
966,782.
Patented Aug. 9, 1910.
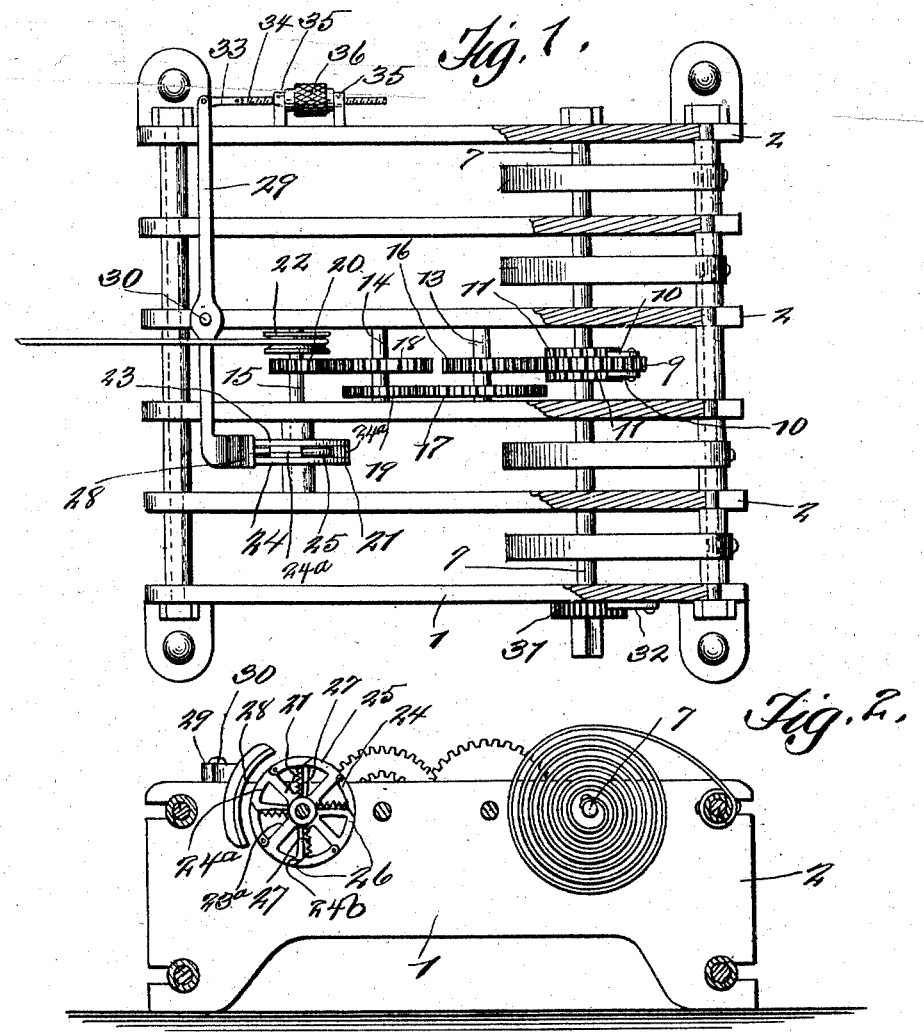
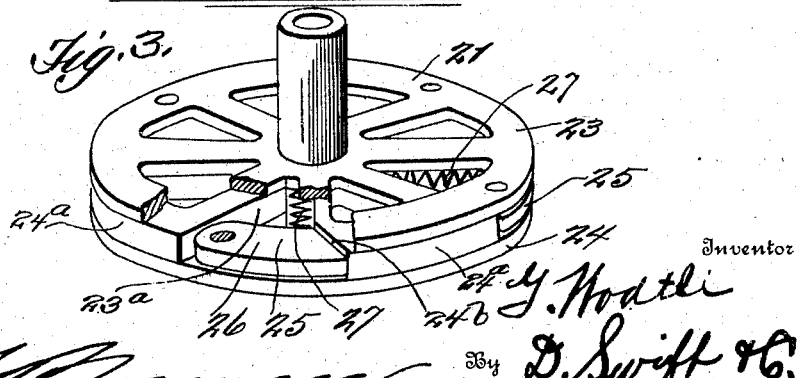

UNITED STATES PATENT OFFICE.

GOTTLIEB WODTLI, OF FOSTER, OREGON.

GOVERNOR FOR SPRING-MOTORS.

966,782.  Specification of Letters Patent.  Patented Aug. 9, 1910.

Application filed October 2, 1907.  Serial No. 395,544.

*To all whom it may concern:*

Be it known that I, GOTTLIEB WODTLI, a citizen of the United States, residing at Foster, in the county of Linn and State of Oregon, have invented a new and useful Governor for Spring-Motors; and I do hereby declare the following to be a full, clear, and exact description of the invention, such as will enable others skilled in the art to which it appertains to make and use the same.

This invention, broadly speaking, pertains to a new and useful governing mechanism, and incidentally includes in combination with said mechanism a spring motor device, to which the mechanism or governor is applied.

The invention has for its main object to provide a governor device, carried by the balance wheel of the spring motor, whereby as the balance wheel rotates at a fast rate of speed, spring tensioned segments are forced outwardly, by the centrifugal force, and when the said segments are swung outward, they are contacted with by a brake shoe equipped lever, which will regulate the rotating of the balance wheel.

This invention comprises further objects and combinations of elements which will be hereinafter more fully described, shown in the accompanying drawings, and the novel features thereof will be pointed out by the appended claim.

To obtain a full and correct understanding of the details of construction, combinations of features, elements and advantages, reference is to be had to the hereinafter set forth description and the accompanying drawings in connection therewith, wherein—

Figure 1 is an elevation view of the device, partly in section. Fig. 2 is a sectional view taken through Fig. 2 along side of one of the springs and a balancing wheel. Fig. 3 is a detail view of the governing mechanism.

Like numerals of reference are used to indicate like elements throughout the several views of the drawings.

In regard to the drawings 1 designates the frame work of the device, which is composed of a plurality of division plates 2, which separate the frame work into five divisions 3 and 4.

Journaled in bearings at one end of the frame work is a spring-actuated shaft 7. Disposed in the division 3 and loosely mounted upon the shaft 7 is a gear 9, upon the opposite faces of which are pivoted spring-actuated pawls 10, designed to engage the ratchets 11, which are movable with the shaft 7. This construction is for the purpose of allowing the shaft 7 to be rotated in one direction by means of a strong steel lever, so as to wind the springs, without rotating the said gear 9, and, as the springs unwind the said shaft will be rotated in the opposite direction, in which event the said ratchets would rotate therewith, thereby causing the said gear to also rotate in the same direction, through the medium of the spring actuated pawls.

Journaled in bearings of the frame are shafts 13, 14 and 15, upon which are mounted intermeshing gears 16, 17, 18, 19 and 20. By this chain of gears, the shaft 15 is furnished power by the spring-actuated shaft 7.

Mounted upon the shaft 15, in order to rotate therewith, is a balance wheel 21 and a pulley 22. The purpose of the balance wheel is to provide an even movement and to increase the momentum. The pulley 22 is designed for the purpose of belting the motor to a cream separator, not shown.

The balance wheel is provided with means for governing the speed of the motor; this balance wheel consists of two members 23 and 24, between which the governing mechanism 25 is mounted. Fixed between these members 23 and 24 is an intermediate section 24$^a$, which is provided with radial V-shaped spaces 23$^a$, portions of which are beveled, as at 24$^b$. Said governor mechanism comprises the pivoted segments 26, having beveled portions similar to the beveled portions 24$^b$ and which are pivoted in said spaces. Said segments are adapted as the balance wheel rotates with increased momentum, to oscillate outward, against the tension of the spring 27, until their outer peripheries engage the friction shoe 28, of the brake lever 29, which is pivoted, as at 30, to one of the division plates, as clearly shown in the drawings.

To adjust the lever 29, whereby the friction between the shoe 28 and the segments 26 may be increased or decreased, a threaded rod 34 is provided. This rod 34 is pivoted to the link 33, which in turn is pivotally connected to one end of the lever 29. The rod 34 is loosely mounted and guided in the bracket arms 35, between which the thumb sleeve 36 is interposed. This sleeve 36 is threaded to the rod 34, and by manipulating it in one direction or the other, the rod 34 will be forced in one direction or the other, thereby imparting a pivotal movement to the lever 29. By imparting this movement to the lever 29, the shoe end of the lever will be brought closer to or farther from the pivotal segments 26, thereby increasing or decreasing the friction between the shoe and the said segments. The rod 34 does not thread into the bracket arms 35, but is only guided and supported by the arms.

The shaft 7 is provided with a ratchet 31 upon its end, which is engaged by a spring pawl device 32, so as to prevent retrogression of the said shaft after the springs 8 are wound up, as will be clearly seen in the drawings.

Having thus fully described the invention, what is claimed as new and useful by the protection of Letters Patent, is:—

In a motor, a driven shaft, a balance wheel comprising two annular members having an intermediate section therebetween, said section and said members having spaces therebetween, said section having beveled portions located adjacent said spaces, segments pivoted between and to said members within said spaces and provided with beveled portions to coöperate with the first named beveled portions to prevent the inward movement of said segments, springs disposed radially from the center of the balance wheel and connected to the segments, and a brake shoe equipped lever having its shoe adapted to be separately engaged by said segments as they are extended under centrifugal action.

In testimony whereof I have signed my name to this specification in the presence of two subscribing witnesses.

GOTTLIEB WODTLI.

Witnesses:
ANNA L. WODTLI,
EMMA WODTLI.